(12) United States Patent
Fournel et al.

(10) Patent No.: US 8,172,955 B2
(45) Date of Patent: May 8, 2012

(54) PROCESS FOR DECONTAMINATING AN ORGANIC SOLID SUBSTRATE CONTAMINATED BY SOLID RADIOACTIVE PARTICULATE INORGANIC CONTAMINANTS, USING DENSE PRESSURIZED $CO_2$

(75) Inventors: Bruno Fournel, Venejan (FR); Julien Galy, Carbonne (FR); Frédéric Barth, St Paul 3 Chateaux (FR); Patrick Lacroix-Desmazes, Montpellier (FR); Serge Lagerge, Lunel (FR); Sophie Dussolliet, Aix en Provence (FR); Jérôme Blancher, Courthezon (FR)

(73) Assignees: Commissariat a l'Energie Atomique, Paris (FR); Areva NC, Paris (FR)

( * ) Notice: Subject to any disclaimer, the term of this patent is extended or adjusted under 35 U.S.C. 154(b) by 268 days.

(21) Appl. No.: 12/280,205

(22) PCT Filed: Feb. 23, 2007

(86) PCT No.: PCT/EP2007/051773
§ 371 (c)(1),
(2), (4) Date: Nov. 20, 2008

(87) PCT Pub. No.: WO2007/096424
PCT Pub. Date: Aug. 30, 2007

(65) Prior Publication Data
US 2009/0056742 A1    Mar. 5, 2009

(30) Foreign Application Priority Data

Feb. 24, 2006 (FR) ...................................... 06 50650

(51) Int. Cl.
*B08B 7/04* (2006.01)
*B08B 3/04* (2006.01)
*B08B 3/10* (2006.01)
*B08B 3/14* (2006.01)
*B08B 5/02* (2006.01)

(52) U.S. Cl. ................. 134/34; 134/32; 134/37; 134/10; 510/110

(58) Field of Classification Search ............ 134/31, 134/34, 37, 12; 510/110
See application file for complete search history.

(56) References Cited

U.S. PATENT DOCUMENTS
5,770,085 A * 6/1998 Wai et al. .................... 210/638
(Continued)

FOREIGN PATENT DOCUMENTS
EP     1 548 810    6/2005
(Continued)

OTHER PUBLICATIONS

Machine translation of foreign patent document JP 2002207097 to Yoshimura et al., Jul. 26, 2002.*

(Continued)

*Primary Examiner* — Michael Kornakov
*Assistant Examiner* — Natasha Campbell
(74) *Attorney, Agent, or Firm* — Brinks Hofer Gilson & Lione

(57) ABSTRACT

Process for decontaminating, cleaning a solid organic substrate contaminated by solid radioactive particulate inorganic contaminants, in which:
the said solid substrate is brought into contact with an extraction medium, devoid of water, comprising:
dense pressurized $CO_2$;
at least one nonhalogenated surface-active compound chosen from block copolymers of poly(ethylene oxide) PEO and poly(propylene oxide) PPO, such as $(EO)_x$-$(PO)_y$ diblock copolymers, $(EO)_x$-$(PO)_y$-$(EO)_x$ triblock copolymers and $(PO)_x$-$(EO)_y$-$(PO)_x$ triblock copolymers, where x and y are integers from 2 to 80 with x other than y; and polydi(1 to 6C)alkylsiloxanes, such as polydimethylsiloxane (PDMS); and
at least one complexing agent chosen from tributyl phosphate (TBP), crown ethers, tributylphosphine oxide, triphenylphosphine oxide and tri(n-octyl)phosphine oxide;
the solid substrate and/or the extraction medium is/are subjected, simultaneously with the contacting operation, to a mechanical action.

32 Claims, 2 Drawing Sheets

U.S. PATENT DOCUMENTS

| | | | |
|---|---|---|---|
| 5,866,005 A | * | 2/1999 | DeSimone et al. ............ 210/634 |
| 6,312,528 B1 | | 11/2001 | Summerfield et al. |
| 2003/0196679 A1 | | 10/2003 | Cotte et al. |
| 2004/0055624 A1 | | 3/2004 | McDermott et al. |

FOREIGN PATENT DOCUMENTS

| | | |
|---|---|---|
| FR | 2 815 559 | 4/2002 |
| JP | 2002207097 A * | 7/2002 |
| WO | WO 0232593 A1 * | 4/2002 |

OTHER PUBLICATIONS

BASF Technical Information: Pluronic PE Types, Mar. 2005.*

International Search Report completed May 31, 2007, in International Application No. PCT/EP2007/051773, filed Feb. 23, 2007.

International Preliminary Report on Patentability dated Mar. 5, 2008 from corresponding International Application No. PCT/EP2007/051773, filed Feb. 23, 2007.

English language translation of the International Preliminary Report on Patentability from corresponding International Application No. PCT/EP2007/051773, filed Feb. 23, 2007.

French Search Report dated Dec. 19, 2006, in corresponding French Patent Application No. 06 50650, filed Feb. 24, 2006.

Fox, Robert V., et al., "Supercritical Fluid Extraction of Plutonium and Americium from Soil Using β-Diketone and Tributyl Phosphate Complexants", ACS Symposium Series, 2003, p. 36-49, vol. 860.

Hutton, Brenda H. et al. "AOT reverse microemulsions in scCO2, a further investigation", Colloids and Surfaces, A: Physicochemical and Engineering Aspects, 2001, p. 177-181, vol. 189.

Hutton, Brenda H., et al., "Investigation of AOT reverse microemulsions in supercritical carbon dioxide", Colloids and Surfaces, A: Physicochemical and Engineering Aspects, 1999, p. 227-241, vol. 146.

Lin, Yuehe, et al., "Supercritical Fluid Extraction of Uranium and Thorium from Nitric Acid Solutions with Organophosphorus Reagents", Environ. Sci. Technol. 1995, p. 2706-2708, vol. 29.

Lin, Yuehe, et al., "Supercritical Fluid Extraction of Thorium and Uranium Ions from Solid and Liquid Materials with Fluorinated β-Diketones and Tributyl Phosphate", Environ. Sci. Technol., 1994, p. 1190-1193, vol. 28.

Liu, Juncheng et al., "Formation of Water-in-$CO_2$ Microemulsions with Non-Fluorous Surfactant Ls-54 and Solubilization of Biomacromolecules", Chem. Eur. J., 2002, p. 1356-1360, vol. 8, No. 6.

Liu, Juncheng et al., "An investigation of non-fluorous surfactant Dynol-604 based water-in-$CO_2$ reverse micelles by small angle X-ray scattering", J. of Supercritical Fluids, 2003, p. 275-280, vol. 26.

Liu, Juncheng et al., "Micellization of sodium bis-(2-ethylhexyl)sulfosuccinate in supercritical $CO_2$ with fluorinated co-surfactant and its solubilization of hydrophilic species", J. of Supercritical Fluids, 2005, p. 121-130, vol. 33.

Liu, Jun Cheng, et al., "Study on the Phase Behavior of Supercritical $CO_2$/Dynol-604/Water System and Solubilzation of Methyl Orange in the Microemulsions", Chinese Chemical Letters, 2002, p. 87-90, vol. 13, No. 1.

Liu, Juncheng et al., "Investigation on the solubilization of organic dyes and micro-polarity in AOT water-in-$CO_2$ microemulsions with fluorinated co-surfactant by using UV-Vis spectroscopy", J. of Supercritical Fluids, 2004, p. 97-103, vol. 32.

Murzin, A.A., et al., "Interaction of Hexafluoroacetylacetone with metals and their alloys in the medium of supercritical carbon dioxide in the processes of equipment decontamination", Radiochemistry, 2003, p. 131-134, vol. 45, No. 2.

Murzin, A.A., et al., "Deactivation in Sub- and Supercritical Carbon Dioxide", Radiochemistry, 2002, p. 410-415, vol. 44, No. 4.

Murzin, A.A., et al., "Supercritical Fluid Extraction of Uranium and Transuranium and Rare-Earth Elements from Surfaces of Solids", Radiochemistry, 1998, p. 47-51, vol. 40, No. 1.

Toews, Karen L., et al., "Complexation and Transport of Uranyl Nitrate in Supercritical Carbon Dioxide with Organophosphorus Reagents", Radiochimica Acta, 1996, p. 179-184, vol. 75.

* cited by examiner

PROCESS FOR DECONTAMINATING AN ORGANIC SOLID SUBSTRATE CONTAMINATED BY SOLID RADIOACTIVE PARTICULATE INORGANIC CONTAMINANTS, USING DENSE PRESSURIZED $CO_2$

This application is a National Stage application of International Application No. PCT/EP2007/051773 filed Feb. 23, 2007, the entire contents of which are hereby incorporated herein by reference. This application also claims the benefit under 35 U.S.C. §119 of French Patent Application No. 06 50650, filed Feb. 24, 2006, the entire contents of which is hereby incorporated herein by reference.

The present invention relates to a process for the radioactive decontamination, cleaning of a solid organic substrate contaminated, polluted, soiled by solid radioactive particulate inorganic contaminants, using dense pressurized $CO_2$, in particular supercritical $CO_2$.

The process according to the invention is applied in particular in the decontamination of organic nuclear waste contaminated by radioactive polar oxides, such as $PuO_2$.

Such waste is generated, for example, during the process for the manufacture of the nuclear fuel known as MOX (Mixed OXides) composed of a mixture of uranium oxide ($UO_2$) and plutonium oxide ($PuO_2$).

Most of this waste is composed of glove box ("GB") gloves and waste chutes. This waste constitutes waste "Not Suitable for Surface Storage" (NSSS).

This organic waste is essentially composed of PVC, polyurethane and Hypalon®.

The purpose of radioactive decontamination is in particular, for example in the case of the contaminated organic waste resulting from the process for the preparation of MOX mentioned above, to reduce the a activity of the contaminated substrate treated in order to allow it to be packaged and stored under less restrictive conditions and at lower costs than NSSS waste.

Numerous decontamination processes exist which are chemical, physical or physicochemical processes.

The decontamination techniques commonly used to date are chemical techniques essentially targeted at dissolving the contaminant or pollutant and at performing an extraction; they generally consist in employing organic solvents, or detergents or surfactants in aqueous solutions.

The waste described above generated during the process for the manufacture of the MOX fuel is currently treated by a process employing dissolution, solubilization of $PuO_2$ in a silver solution. Nevertheless, this process generates contaminated liquid effluents which subsequently have to be subjected to a specific treatment.

Decontamination processes using solvents thus exhibit numerous disadvantages, in particular in terms of volume of the waste generated, on the one hand, and in terms of strong design constraints related to the risk of criticality in the case of $PuO_2$, on the other hand. This is the reason why the use of fluids in the dense pressurized state, gas, liquid or in particular supercritical ("SC"), for the cleaning or decontamination of components, has been envisaged and studied.

This is because these fluids exhibit solvent properties which allow them to replace many common solvents employed in cleaning techniques.

Furthermore, the particular qualities of these fluids make it possible to develop processes which are not damaging to the environment and which generate small amounts of discharges.

In particular, cleaning with dense $CO_2$ in the gaseous, liquid or supercritical state has been very widely studied and developed and has reached the industrial stage.

The supercritical ("SC") region is a specific phase of $CO_2$. Beyond its critical point (Tc=31.1° C. or 294.1 K and Pc=7.4 MPa), $CO_2$ is said to be supercritical and its physicochemical properties change and lie between those of gases and of liquids.

$CO_2$ is the fluid most commonly used for supercritical fluid extraction as $CO_2$ is inert and non-flammable. Consequently, this fluid is employed with greater ease.

In the case of the extraction of polar inorganic compounds, it is necessary to add cosolvents or third substances or additives in order to increase the solubility of the polar molecules in $CO_2$. The cosolvents are generally alcohols, while the third substances or additives are provided in the form of surfactants or ligands. These compounds participate in various processes for the extraction or decontamination of matrices by SC $CO_2$. The applications are diverse but they all hinge on the synergy between the SC $CO_2$ and the additive.

In other words, the nonpolar nature of SC $CO_2$ is the main problem in the extraction of charged polar inorganic or organic entities, such as metal oxides, for example $PuO_2$, and ions, polar organic molecules, such as fats, and organometallic compounds.

Specifically, very rapid redeposition of the contaminants, for example the oxides, occurs and there is no efficient transfer and suspending. The solvent, namely, for example, the $CO_2$ or the $CO_2$ and the cosolvent, cannot interact, for example, with the metal ions or the particulate oxides. It is therefore necessary to add additives, such as ligands or surfactants, to the $CO_2$ in order to increase its polarity.

Both in the case of the ligands and in the case of the surfactants, it is preferable to use fluorinated compounds as they are soluble in SC $CO_2$. Nevertheless, this presents a problem of posttreatment in the nuclear industry.

Less soluble fluorine-free surfactants are increasingly arousing the interest of researchers ([10][11][12][13][14]). The main difficulty lies in the problematic dissolution, solubilization of the nonfluorinated surfactants in the SC $CO_2$. The literature reports water-in-$CO_2$ microemulsions but in the presence of fluorinated surfactants ([15][16]).

Studies have been carried out ([1][2]) on contamination in the form of metal cations, such as $Ni^{2+}$ or $Cr^{3+}$, but also of cations of radioelements, such as $Am^{3+}$, and the like. The decontamination strategy in this specific case progresses by using complexing ligands. This is because the latter, provided that they are carefully chosen, will make possible efficient and selective extraction of the metal cations.

The documents [3] and [4] thus describe processes for decontamination by complexing agents. The results obtained on different matrices are noteworthy. However, the compounds used can prove to be expensive and highly polluting. Furthermore, an aqueous nitric phase is necessary for the feasibility of the extraction. The problem is again posed of the effluents generated by this aqueous phase.

Another field of application of supercritical fluids is the separation of radioelements.

The document [5] studies a process equivalent to the PUREX process but in a SC $CO_2$ medium. It should be remembered that the PUREX process is used to separate plutonium from uranium. For this, nitric acid is conjugated with TBP (tributyl phosphate) with the aim of forming the complex $[UO_2(NO_3)$ 2 $(TBP)_2]$. This complex can then be extracted by the continuous phase. In the "Super-DIREX" process, which forms the subject-matter of this document, the continuous phase is SC $CO_2$. The irradiated fuel from a nuclear power station is treated and it is shown that the extraction yield for the Pu and U depends on the operating pressure and temperature of the process.

Generally, the extraction of the uranium and plutonium from the nitric medium takes place by addition of a hydrocarbon solvent, such as dodecane, and TBP. The document [6] reports that SC $CO_2$ is an advantageous alternative, in particular in terms of stability with regard to radiation.

The documents [7] and [8] use SC $CO_2$ saturated with Lewis bases, such as TBP, tributylphosphine oxide (TBPO), triphenylphosphine oxide (TBPO) or tri(n-octyl)phosphine oxide (TOPO), to extract uranium or thorium ions from solid matrices or from nitric solutions. The SC $CO_2$ bubbles into a nitric solution for 15 minutes under static conditions and 15 minutes under dynamic conditions. The operating conditions are 200 bar and 60° C. with an $HNO_3$ concentration of 1M for an efficiency of more than 90%.

The documents [9], [3] and [4] use β-diketones and fluorinated organophosphorus ligands for the extraction of uranium or lanthanides from solid surfaces. The efficiency exceeds 95% with regard to true contamination.

The decontamination of substrates contaminated by $PuO_2$ has, for the moment, been little studied in a supercritical medium.

The existing processes and devices for cleaning or decontaminating by a dense pressurized fluid, in particular supercritical fluid, do not make it possible to obtain satisfactory decontamination of substrates, components or organic materials contaminated by solid radioactive particulate inorganic contaminants, in particular when these contaminants are polar compounds, such as $PuO_2$.

Furthermore, decontamination processes and devices of the prior art employ aqueous media which are to be banned due to the risk of criticality associated with water, which is a neutron moderator.

In addition, the problem of the recontamination of cleaned components by solid contaminant particles which are insoluble in the dense fluid, which are redeposited on the clean components, is not satisfactorily solved by any of the processes and devices of the prior art.

Furthermore, the processes and devices of the prior art are able to provide decontamination only of small amounts of materials and of components which are small in size and of relatively low weight.

There thus exists a need for a process for cleaning, decontaminating, with a dense pressurized fluid, a substrate contaminated by solid radioactive particulate inorganic contaminants, in particular polar contaminants, such as $PuO_2$, which makes it possible to satisfy the strict requirements and criteria of the nuclear industry, for example as regards criticality, and which has consequently to avoid in particular use of water or aqueous media.

There also exists a need for such a cleaning or decontaminating process which generates a limited, indeed even zero, amount of primary and secondary effluents, in particular of liquid effluents, and which thus avoids having recourse again to other processes for treating these effluents.

There also exists a need for a process which can be employed at relatively low pressures and temperatures. This is because the pressure is an important constraint in the context of any nuclear process and it would be advantageous to be able to operate at lower pressures than those used to date.

There next exists a need for such a process which makes it possible to obtain perfect cleaning, even of components which are large in size and of high weight and of large amounts of materials, whatever the nature of these materials.

There also exists a need for a process for cleaning, decontaminating, by a dense pressurized fluid, which prevents the (re)contamination of the cleaned components by redeposition of the solid particles.

Finally, there exists a need for such a process which is simple, reliable and easy to implement and which uses only readily available and inexpensive compounds.

REFERENCES

1. Tueur, A. (1997). Doctoral thesis, "*Etude et optimisation de la solubité de b-dicétonates métalliques dans le dioxide de carbone supercritique: application à l'extraction des ions cobalteux et uranyl es presents dans les sols*"[Study and optimization of the solubility of metal β-diketonates in supercritical carbon dioxide: application to the extraction of cobaltous and uranyl ions present in sols], Montpellier II.
2. Fox, R. V. and B. J. Mincher (2003). "SFE of plutonium and americium from soil using beta diketones and TBP complexants." *ACS Symposium Series* 860: 36-49.
3. Murzin, A. A., V. A. Babain, A. Y. Shadrin, V. A. Kamachev, V. N. Romanovski, V. A. Starchenko, S. V. Podoinistyn, Y. A. Revenko, M. V. Logunov and N. G. Smart (2002). "Deactivation in sub and supercritical carbon dioxide." *Radiochemistry* 44(4): 410-415.
4. Murzin, A. A., V. A. Babain, A. Y. Shadrin, V. A. Kamachev, S. A. Strelkov, R. N. Kiseleva, D. N. Shafikov, S. V. Podoinistyn and D. N. Kovalev (2003). "Interaction of hexafluoroacetylacetone with metal and their alloys in the medium of supercritical carbon dioxide in the processes of equipment decontamination." *Radiochemistry* 45(2): 131-134.
5. Miura, S., M. Kamiya, K. Nomura, T. Koyama, S. Ogumo, T. Shimada, Y. Mori, Y. Enokida and I. Yamamoto (2003). *Extraction of uranium and plutonium from irradiated fuel in Super-DIREX reprocessing system*. 2nd International Symposium on Supercritical Fluid Technology for Energy and Environment Applications, Nagoya, Japan.
6. Toews, K. L., N. G. Smart and C. M. Wai (1996). "Complexation and transport of uranyl nitrate in supercritical carbon dioxide with organophosphorus reagents." *Radiochimica Acta* 75: 179-184.
7. Lin, Y., C. M. Wai, F. M. Jean and R. D. Brauer (1994). "Supercritical fluid extraction of thorium and uranium ions from solid and liquid materials with fluorinated b diketones and tributyl phosphate." *Environmental Science and Technology* 28: 1190-1193.
8. Lin, Y., N. G. Smart and C. M. Wai (1995). "Supercritical fluid extraction of uranium and thorium from nitric acid solution with organophosphorus reagent." *Environmental Science and Technology* 29: 2706-2708.
9. Murzin, A. A., V. A. Babain, A. Y. Shadrin, I. Smirnov, V. N. Romanovsky and M. Z. Muradymov (1998). "Supercritical fluid extraction of uranium and transuranium and rare earth elements from surface of solids." *Radiochemistry* 40(1): 47-51.
10. Hutton, B. R., J. M. Perera, F. Grieser and G. W. Stevens (1999). "Investigation of AOT reverse microemulsions in supercritical carbon dioxide." *Colloids and Surfaces A: Physiochemical and Engineering Aspects* 146: 227-241.
11. Hutton, B. R., J. M. Perera, F. Grieser and G. W. Stevens (2001). "AOT reverse microemulsions in SC $CO_2$—a further investigation." *Colloids and Surfaces A: Physiochemical and Engineering Aspects* 189: 177-181.
12. Liu, J. C., B. X. Han, J. L. Zhang, G. Z. Li, X. Zhang, J. Yang and B. Dong (2002). "Formation of water in $CO_2$ microemulsions with non fluorous surfactant Ls-54 and solubilisation of biomacromolecules." *Chem. A: Eur. J.* 8: 1356-1360.
13. Liu, J. C., J. L. Zhang, B. X. Han, G. Z. Li and G. Y. Yang (2002). "Study on the phase behavior of supercritical $CO_2$/Dynol-604/Water System and solubilisation of methyl orange in the microemulsion." *Chinese Chemical letters* 13(1):87.
14. Liu, J., J. Zhang, T. Mu, B. X. Han, G. Z. Li, J. S. Wang and B. Dong (2003). "An investigation of non fluorous surfactant Dynol 604 based water-in-$CO_2$ reverse micelles by small angle X-ray scattering." *Journal of Supercritical Fluids* 26:275-280.
15. Liu, J., Y. Ikushima and Z. Shervani (2004) "Investigation on the solubilization of organic dyes and micro-polarity in AOT water-in-$CO_2$ microemulsions with fluorinated co-surfactant by using UV-Vis spectroscopy." *Journal of Supercritical Fluids* 32: 97-103.
16. Liu, J., Z. Shervani, P. Raveendrana and Y. Ikushima (2005). "Micellization of sodium bis(2-ethylhexyl)sulfosuccinate in supercritical $CO_2$ with fluorinated co-surfactant and its solubilization of hydrophilic species." *Journal of Supercritical Fluids* 33: 121-130.
17. Koh, M., K. Park, H. Kim and H. Kim (2003). *Decontamination process development using $CO_2$ water emulsion. 2nd International Symposium on Supercritical Fluid Technology for Energy and Environment Applications*, Nagoya, Japan.

The aim of the present invention is to provide a process for decontaminating, cleaning, by a dense pressurized fluid which meets, inter alia, the needs mentioned above.

This aim and yet others are achieved, in accordance with the present invention, by a process for decontaminating, cleaning, a solid organic substrate contaminated by solid radioactive particulate inorganic contaminants, in which:
  the said solid substrate is brought into contact with an extraction medium, devoid of water (water free), comprising:
    dense pressurized $CO_2$;
    at least one nonhalogenated surface-active (surfactant) compound chosen from block (sequential) copolymers of poly(ethylene oxide) PEO and poly(propylene oxide) PPO, such as $(EO)_x$-$(PO)_y$ diblock copolymers, $(EO)_x$-$(PO)_y$-$(EO)_x$ triblock copolymers and $(PO)_x$-$(EO)_y$-$(PO)_x$ triblock copolymers, where x and y are integers from 2 to 80 with x other than y; and polydi(1 to 6C)alkylsiloxanes, such as polydimethylsiloxane (PDMS); and
    at least one complexing agent chosen from tributyl phosphate (TBP), crown ethers, tributylphosphine oxide, triphenylphosphine oxide, and tri(n-octyl)phosphine oxide;
  the solid substrate and/or the extraction medium is/are subjected, simultaneously with the contacting operation, to a mechanical action.

The said surface-active compound can be defined generally as a compound which lowers the value of the reference water/$CO_2$ interfacial tension below 10 mN·m$^{-1}$.

Furthermore, it should be pointed out that the term "complexing agent" is not really appropriate in the context of the invention but has been used for the purposes of simplification.

This is because, in the process of the invention, complexing in the usual chemical sense does not occur. It should instead evoke a particular affinity with the contamination.

A decontamination process which employs a specific extraction medium which is, basically, devoid of water, and which comprises pressurized $CO_2$, a specific nonhalogenated, in particular nonfluorinated, surface-active compound, composed solely of atoms chosen from O, N, C and H, and chosen from the compounds defined above, and a specific complexing agent; the said process in addition simultaneously subjecting the substrate to mechanical action, is neither described nor suggested by the prior art represented in particular by the documents cited above.

The process according to the invention meets all the needs, criteria and requirements mentioned above and provides a solution to the problems of the processes of the prior art.

The decontamination process according to the invention uses nonhalogenated, in particular nonfluorinated, surfactants in a dense pressurized medium, in particular supercritical medium. Surprisingly, the presence of water in order to employ these surfactants is not necessary. The process according to the invention thus goes against the reasoning followed to date, in which the surfactants were dissolved, solubilized in an aqueous medium, and overcomes a widespread preconception in this field of technology.

It is extremely surprising that, even in the absence of water, excellent cleaning, decontaminating or extracting performances are obtained; this is due in particular to the particular nature of the specific surfactants employed according to the invention and to the combination of these surfactants, on the one hand, with a specific complexing agent and, on the other hand, with the mechanical action exerted on the substrate and/or extraction medium, which favours the transfer of the contaminants from the solid substrate to the dense pressurized phase, for example supercritical phase. It may be said that a true synergy occurs, related to an advantageous combination of effects, between, on the one hand, the specific extraction medium employed, which is devoid of water (water free), and, on the other hand, the mechanical action to which the substrate is subjected; this synergy, which results in an excellent efficiency in decontamination, extraction or cleaning, is all the more unexpected as it applies to contaminants which are usually very difficult to remove, which are the solid radioactive particulate inorganic contaminants present in/on an organic substrate.

The absence of water greatly reduces the volume of the liquid effluents generated and reduces the risks of criticality in a nuclear medium. As the process according to the invention applies to the removal of radioactive contaminants, the absence of water is a fundamental advantage introduced by the process of the invention. Likewise, the use of a nonhalogenated surfactant, "C, H, O, N", meets the specific requirements of the nuclear industry.

In other words, the process according to the invention provides a solution to the extremely specific problems posed by solid radioactive particulate contaminants, in particular polar contaminants, such as $PuO_2$, which are problems related both to the decontamination proper but also to the specifically nuclear nature of the process. Surprisingly, the process according to the invention makes it possible to simultaneously solve these two problems, the solutions of which appear to be contradictory. According to the invention, a high decontamination effectiveness is obtained but without water and without fluorinated surfactant, little waste is thus generated, and any risk of criticality is avoided.

Specifically, the process according to the invention is characterized by the absence of primary and secondary effluents, in particular aqueous effluents, this advantage being related to the fact that, in accordance with the invention, use is made of a medium devoid of water; for this reason, the process according to the invention does not require downstream a treatment of the waste resulting from the process, the contamination is directly recovered and this contamination is not dispersed in an effluent collection. In addition, the operation is carried out at low pressure, in particular in the case where the extraction medium additionally comprises a cosolvent, for example chosen from short-chain alcohols, such as ethanol, propanol and isopropanol, which makes it possible to lower the operating pressure.

It should be noted that the problem of decontamination in a nuclear medium is extremely specific and that the teachings of the extraction or cleaning processes carried out in a non-radioactive medium thus cannot be applied to decontamination in a nuclear medium due to the additional problems related in particular to the criticality, to the reduction of the waste to a minimum, and to the pressure.

The process according to the invention, which thus does not use an aqueous phase, might be defined as a "dry" physicochemical decontamination process without conventional solvent but with a dense pressurized solvent, in particular a supercritical solvent.

In the process according to the invention, a combined or synergistic effect, which is expressed in the absence of water, of the dense pressurized $CO_2$, for example supercritical $CO_2$, of the specific surfactants employed, of the specific complexing agent used, of the possible cosolvents and finally of the mechanical action occurs.

The fluid, in particular in the supercritical state, makes it possible to carry out efficient extractions; the specific surfactant makes it possible to obtain a true dispersion of the solid particles of contaminants in the dense pressurized fluid; the complexing agent and the possible cosolvent make it possible in particular to increase the solubility of the surfactant and thus to operate at reduced pressure, and the complexing agent also increases the decontamination factor; and, finally, the mechanical action promotes the transfer of the contaminants from the solid substrate to the dense pressurized phase.

The presence of the complexing agent and of the possible cosolvent can also produce an interaction with the substrates treated.

This synergistic effect mentioned above ensures the entrainment, surprisingly in the absence of any addition of further aqueous phase, of the radioactive contaminants in a dense pressurized medium, for example supercritical medium, and the efficient recovery of these contaminants.

Even though the use of halogenated surfactants, believed to be highly effective, is avoided and though poor extraction performances could have been expected, excellent results, moreover in the absence of water, are however obtained according to the invention with the specific surfactants employed, believed to be less effective. These excellent results appear to be related in particular to the use of the abovementioned mechanical action.

In addition, according to the invention, it had been demonstrated, in a novel way, that no connection exists between solubility and the effectiveness of the extraction. According to the invention, the aim is rather, going against widespread reasoning, to disperse and not to dissolve, solubilize the contaminants and, in that way, excellent results are obtained while in addition economizing on the surfactants.

Owing to the fact that there is no addition of water, there is no formation of an emulsion, which is disadvantageous due to the large amounts of liquid effluents which it generates, but, surprisingly, formation of a "smoke" of the contaminants, for example of the oxides, in the dense pressurized $CO_2$, for example supercritical $CO_2$. This "smoke" is in fact a "dry" dispersion of the solid particles of radioactive contaminant, for example oxide, in the dense pressurized fluid made possible by the surfactant in the absence of water. That the dense fluid and the contaminants can take a form as surprising as that of the "smoke" is neither described nor suggested in the prior art.

The extraction medium employed in the process according to the invention is thus fundamentally an extraction medium "devoid of water" (water free).

The term "devoid of water" (water free) is understood to mean, within the meaning of the invention, that the extraction medium does not comprise added water.

The water content is generally less than 0.02% by weight, with respect to the weight of the surfactant or surfactants.

More specifically, it may be considered that the water present in the extraction medium is only the water present as unavoidable impurity which might be present in the various compounds, including the surfactant and the complexing agent, of which the extraction medium is composed, in particular when these compounds are used in their commercially available form.

According to the invention, the extraction medium comprises a specific nonhalogenated, nonfluorinated, surface-active compound composed solely of atoms chosen from O, N, C and H.

The term "surface-active compound" is generally understood to mean, within the meaning of the invention, a compound which lowers the value of the reference water/fluid $CO_2$ interfacial tension below 10 mN·m$^{-1}$.

The nonfluorinated surface-active compound or compounds is (are) chosen from block (sequential) copolymers of poly(ethylene oxide) PEO and poly(propylene oxide) PPO, such as $(EO)_x$-$(PO)_y$ diblock copolymers, $(EO)_x$-$(PO)_y$-$(EO)_x$ triblock copolymers and $(PO)_x$-$(EO)_y$-$(PO)_x$ triblock copolymers, where x and y are integers from 2 to 80 with x other than y, such copolymers are available from BASF® under the Pluronic® name.

It has turned out that these copolymers make it possible to obtain maximum effectiveness with regard to the decontamination of organic substrates.

Mention may be made, among the Pluronics products, of the Pluronics products PE 6100, PE 6200, PE 8100 and PE 10100, which respectively correspond to the following formulae:

| Formula | PE 6100 | PE 6200 | PE 8100 | PE 10100 |
|---|---|---|---|---|
| | $(EO)_2$-$(PO)_{31}$-$(EO)_2$ | $(EO)_5$-$(PO)_{34}$-$(EO)_5$ | $(EO)_3$-$(PO)_{42}$-$(EO)_3$ | $(EO)_4$-$(PO)_{59}$-$(EO)_4$ |

The said nonhalogenated, in particular nonfluorinated, surface-active compound generally represents from 0.001 to 1% by weight, for example from 0.01 to 0.04% by weight, of the extraction medium.

While the dense pressurized fluid has the main effect, by virtue of its properties, of performing an efficient extraction, the surfactant for its part makes it possible to ensure the dispersion of the contaminants and in particular of the polar molecules, such as $PuO_2$ or its simulants $CeO_2$ and $Nd_2O_3$, this dispersion being favoured in particular by the mechanical action.

Specifically, the surfactant lowers the surface energy between the solid contaminants and the $CO_2$ and makes possible a fine dispersion of these solid contaminants, such as oxides. It may be said that the surfactant is also an anticoagulant in the sense that it prevents the redeposition of the contaminants.

Finally, the specific surfactant according to the invention can also have a "wetting" action which has the effect of detaching, disengaging the particles of contaminant from the substrate. This is because, if the substrate is a solid exhibiting a high surface energy, the dense pressurized $CO_2$ does not selectively wet the substrate, for example made of polymer, and the contaminants, such as the oxides, are not extracted to any great extent.

The abovementioned surfactants are commercial surfactants which are readily available and relatively inexpensive, which makes the process according to the invention highly profitable economically.

Furthermore, the surfactants employed according to the invention are lower in cost than halogenated surfactants, in particular fluorinated surfactants.

The process makes use of the amphiphilic nature of the surfactants. The hydrophobic part interacts with the $CO_2$, thus dissolving, solubilizing the surfactant in the dense $CO_2$, for example SC $CO_2$.

The hydrophilic part of the surfactant captures the solid particle of contaminant by weak bonding of Van der Waals type.

In the process according to the invention, the procedure is carried out differently from the usual method of action of surfactants, in the presence of water; and the contaminants, such as the radioelements, are in the dry phase formed by the fluid, such as dry $CO_2$, the surfactants and the complexing agent, without water. Once suspended, the particles form, as was indicated above, a type of "smoke" in the fluid, such as SC $CO_2$, which allows them to be entrained downstream in the process, for example towards the first separator (see later). This is because the surfactants are positioned at the particles of contaminants (for example metal oxide)/fluid (for example SC $CO_2$) interface, for this reason ensuring the dispersion of the contaminants, such as the oxides. The reduction in pressure causes the solvent power of the SC $CO_2$ to fall without, however, causing it to return to the gaseous state. In the process according to the invention, it is possible, in one embodiment, to separate the adsorbed particles alone from the free surfactants. This makes it possible to recycle the latter. This has the advantage of not precipitating the unused surfactants and not pointlessly "overloading" the final waste to be stored.

As has already been indicated above, the extraction medium employed in the process according to the invention also comprises a specific complexing agent for the contaminants chosen from TBP, crown ethers, tributylphosphine oxide, triphenylphosphine oxide, and tri(n-octyl)phosphine oxide. Generally, the complexing agent represents from 0.001 to 1% by weight of the extraction medium.

According to the invention, the fluid in the dense pressurized state is generally brought into contact with the components to be cleaned at a pressure of 50 to 700 bar, preferably of 80 to 300 bar, and at a temperature of 15 to 200° C., preferably of 20 to 80° C., better still of 40 to 60° C.

However, according to the invention, lower pressure ranges than in the prior art can be employed by virtue of the addition of the complexing agent and in particular of the possible cosolvent. A particularly appropriate range will thus be from 100 to 150 bar.

The process according to the invention exhibits, of course, all the inherent advantages related to the use, for cleaning, decontamination, of a dense pressurized fluid in place of a conventional solvent, in particular of halogenated hydrocarbon type.

Preferably, the dense pressurized $CO_2$ is in the liquid and/or supercritical state, that is to say that the dense $CO_2$ is under a pressure and at a temperature such that the $CO_2$ is in the liquid and/or supercritical state; more preferably, the $CO_2$ is in the supercritical state.

Thus, more specifically, in the process according to the invention, use is made, for example, of gaseous $CO_2$ under standard temperature and pressure conditions, and its density is increased by increasing its pressure. By also modifying the temperature, the system will thus be positioned in the region where the $CO_2$ is in the dense and pressurized state, preferably in its liquid and/or supercritical state. This region can easily be determined by a person skilled in the art.

According to the invention, it is possible to vary, in a controlled way, the extractive properties of the $CO_2$ by adjusting the two parameters of temperature and of pressure while remaining in the dense and pressurized region, preferably the liquid and/or supercritical, of the $CO_2$: thus, the increase in the pressure and temperature increases the ability to dissolve, solubilize while the reduction in the pressure reduces the viscosity and increases the tendency to diffuse ("diffusivity").

These two characteristics make it possible to control a fluid, the solvent power of which can be adjusted, in terms of dissolution, solubilization in particular of light polluting or contaminating compounds, in this instance solely particulate, which it is desired to remove by the cleaning, and in terms of kinetics of extraction, in particular for the pollutants which are found in the porous regions, porosity, of the material, when porous components are cleaned.

Thus, according to the invention, it is possible, during the treatment, to carry out compression/decompression cycles, preferably very rapid cycles, with, for example, an amplitude of the variation in pressure of 10 to 100 bar and time intervals of 10 seconds to several minutes, for example 10 minutes, the whole operation, for example, for one to several hours, for example 10 hours.

The penetration of the solvent fluid into the material of the components, parts, to be cleaned is thus increased, which has the consequence of improving the cleaning performance.

Advantages of the process of the invention result from the specific characteristics of the fluids in the dense pressurized state, in particular supercritical fluids. These advantages are in addition to and are enhanced by the mechanical actions, these mechanical actions being composed, for example, of the optional combined effects of the stirring in a rotary basket or drum and of the optional action of a high-speed jet, which are described in detail below.

The treatment conditions of the process of the invention, in particular as a result of the mechanical action when recourse is made especially to stirring and/or to the optional action of a jet, are markedly less severe than those of the processes of the prior art employing dense pressurized fluids, which results in a considerable energy saving for the process of the invention.

In addition, a cleaning, decontamination effectiveness is obtained which is comparable, indeed even superior, in most cases, with a much shorter treatment time, for example of 10 to 15 minutes; this again has a positive effect on the energy and financial cost of the process.

The milder conditions, namely low temperatures, low pressures and short treatment time, of the process of the invention are in particular due to the combination of the action of the specific nonhalogenated surfactant, of the specific complexing agent according to the invention, and of the mechanical action, this mechanical action being, for example, stirring caused by a moving drum or basket, and/or the optional action of a high-speed jet of dense fluid.

The fluid used in the process according to the invention is carbon dioxide.

The low viscosity of $CO_2$ in the dense state, its high diffusion coefficients and its very low interfacial tension make possible the cleaning of components which are complex in their shapes and their physical characteristics, in particular when adsorption phenomena are present, whether at the surface or at the core of the component.

Mention may additionally be made, among the advantages of using $CO_2$ as replacement for processes conventionally employed, which use organic solvents, of:
- a virtually zero residual effluent volume, strictly limited to the recovery of the pollutants extracted and to the recycling of the purified $CO_2$ gas;
- a significant saving, for example, whether in terms of solvent, by the absence of treatment or recovery of effluents, or also by the use of relatively inexpensive $CO_2$;
- complete absence of toxicity with regard to the users in comparison with cleaning agents, such as trichloroethylene or others;
- an adjustability in the solvent power of the molecule which can vary according to the operating conditions, that is to say of the pressure and temperature, making it possible to adapt to the nature of the polluting, contaminating products to be removed, extracted.

In other words, the two characteristics of pressure and of temperature make it possible to control a fluid, the solvent power of which can be adjusted in terms of dissolution, solubilization, in particular of undesirable compounds which contaminate or pollute the components, parts, and of kinetics of extraction.

The high volatility of $CO_2$ under standard conditions (pressure and temperature) characterizes it as a dry solvent not requiring a drying stage after cleaning.

In addition, with the specific organic substrate treated by the process according to the invention, a strong interaction has been observed between the $CO_2$ and the organic substrate, for example the organic polymer, such as PVC, which results in a modification of the structure of the substrate, for example a polymer, due to the dissolution of a portion of its components.

This unexpected effect, which is specific to the organic substrates, further improves the effectiveness of the process.

According to the invention, the solid substrate and/or the extraction medium, simultaneously with bringing the solid substrate into contact with the extraction medium, is/are subjected to mechanical action.

This action can be chosen, for example, from one or more from stirring, turbulence, shearing, electromechanical action and ultrasonic action.

Preferably, according to the invention, the extraction medium can additionally comprise a compound referred to as "cosolvent".

The addition of a cosolvent to the fluid, for example to SC $CO_2$, makes it possible to increase the polarity of the latter.

The addition of a cosolvent to the dense pressurized fluid makes it possible to obtain complete extraction of the solid radioactive particulate inorganic contaminating compounds, in other words of the undesirable compounds, from the substrate, components, parts, to be decontaminated.

According to the invention, the said cosolvent is chosen, for example, from alcohols, for example lower aliphatic alcohols having from 1 to 5 carbon atoms, such as ethanol, methanol, propanol, isopropanol or butanol; ketones, such as acetone; terpenes; cyclohexanes; hexanes; dimethyl sulphoxide (DMSO); and their mixtures.

It should be noted that some complexing agents, such as TBP, can also act as cosolvent.

According to the invention, the said cosolvent represents from 0.001 to 10% by weight, preferably from 0.01 to 1% by weight, more preferably from 0.02 to 1% by weight, better still from 0.02 to 0.1% by weight, of the extraction medium.

The complexing agent and the optional cosolvent increase the solubility of the surfactant in the $CO_2$, which results in a fall in the operating pressure which is particularly advantageous in the context of the process of the invention operating in a nuclear medium.

It may be said that the complexing agent has a particular affinity with regard to the decontamination, while the cosolvent acts above all in the sense of a reduction in the pressure.

In addition, the complexing agent, such as TBP (it being possible for the latter also to act as cosolvent), and the cosolvent, such as hexane or DMSO, interact with the organic materials and the contamination of the substrate treated according to the invention, in particular by removing a surface layer of the substrate (which generally concentrates a large part of the contamination of the substrate) or by dissolving the additives (for example plasticizers, such as phthalates in the case, for example, of PVC) present in these organic materials, such as polymers. This interaction with the surface layer of the substrate can contribute to increasing the efficiency of the process.

A particularly preferred extraction medium will comprise $CO_2$ in the supercritical state and:
- from 0.001 to 1% of a nonfluorinated emulsifying surfactant, such as a Pluronic® product, which also acts as anticoagulant surfactant,
- from 0.001 to 1% of a cosolvent, such as ethanol or methanol,
- from 0.001 to 1% of a complexing agent, such as TBP.

Any type of solid substrate (or component, part, or matrix) composed of an organic material can be treated by the process of the invention.

It should be noted that, as a result of the generally "mild" temperature and pressure conditions of the process of the invention, thermally and/or mechanically unstable, frangible, brittle, components, parts, can be treated by the process of the invention.

Likewise, the process of the invention is not limited with regard to the size and/or weight of the components, parts, to be treated.

It should be noted that the process according to the invention makes it possible to treat substrates, in particular solid substrates, without it being necessary to split or divide them up beforehand, for example before introducing them into the autoclave in which the extraction is carried out.

In addition, the process according to the invention makes it possible to treat the substrates without there being reason to carry out another preliminary treatment.

The entire decontamination can be carried out by the process of the invention alone.

The materials which can be cleaned, decontaminated by the process of the invention are solid, organic materials, such as artificial, synthetic or natural fabrics; polymers, plastics, resins, latexes, rubbers, and the like; and composite materials comprising several among the said materials.

The components, parts, substrates treated by the process according to the invention are in particular substrates or components used in the nuclear industry and which are contaminated by radioelements, such as glove box gloves and glove ports.

The term "cleaning", decontamination according to the invention is understood to mean, generally, the removal or extraction of undesirable polluting, contaminating compounds which do not normally form part of the constituent material of the substrate, components, parts.

These polluting, contaminating compounds to be extracted can occur both at the surface of the substrate, of the component, part, and also inside the material of the substrate, component, part, even within, for example, its porous regions, its porosity.

The essential aim of the process according to the invention is to clean the components from any solid radioactive particulate inorganic polluting or contaminating compound found in or on the substrate, components, parts.

The solid radioactive particulate inorganic polluting, contaminating compounds are in particular polar compounds.

These contaminants can be free metals or semimetals (metalloids) in the form of their radioactive isotopes and/or compounds of these radioactive metals or semimetals (metalloids), or also compounds such as radioactive isotopes of iodine, tritium and tritiated organic compounds.

The metals are in particular transition metals, actinides and lanthanides.

These metals are, for example, strontium, silver, caesium, antimony, cobalt, manganese, neodyme, cerium, uranium, plutonium, americium, lanthanum and thorium.

The term "metal or semimetal (metalloid) compounds" is understood to mean all the compounds derived from these metals or semimetals, in particular their oxides, such as $PuO_2$, $CeO_2$, $Nd_2O_3$ or caesium, americium, antimony, manganese, cobalt and silver oxides, their salts, their organometallic derivatives, and the like. Mention may be made, among the salts, of nitrates, sulphates, chlorides, and the like, which may or may not be hydrated.

It turned out that the process according to the invention is particularly effective in extracting, removing metal salts, metals and oxides, such as $PuO_2$, from organic materials.

The process can thus be applied to the decontamination of gloves or glove ports contaminated by $PuO_2$.

The contaminants or pollutants are in the form of particles. There is no limitation on the size and the shape of these particles. They can, for example, be chips of metal or other with completely random shapes.

The size of these particles can, for example, be less than or equal to 100 µm, preferably from 10 nm to 100 µM.

The temperature and pressure ranges employed during the cleaning operation may vary, provided that the fluid always remains a dense pressurized fluid, preferably in a liquid and/or supercritical state; likewise, as was indicated above, compression/decompression cycles can be carried out.

These temperature and pressure ranges have already been mentioned above.

Such conditions can be maintained throughout the duration of the process or else only at the beginning of the cleaning or treatment process, where such conditions, which correspond to a high density and to a high temperature, the predominant phenomenon being the dispersion, make it possible to very rapidly extract, remove the compounds external to the matrix forming the component.

Generally, the duration of the cleaning treatment, that is to say the period of time during which the component(s), part(s), to be cleaned is/are left in contact with the dense pressurized fluid, is from 1 or a few minutes, for example 10 minutes, to 1 or a few hours, for example 5 hours, depending on the flow rate of the fluid and on the amount of materials to be treated. Again, according to the invention, this period of time is short, as a result of the mechanical action to which the substrate is subjected, in particular when the substrate is in contact with a turbulent fluid, for example stirred by paddles or propellers, or else when the substrates are stirred in a drum or basket, and optionally when the substrates are subjected to the action of a high-speed jet of fluid.

After a few minutes, that is to say, for example, after 5 minutes, once the components have been subjected to the pressure and temperature conditions of the process, the extraction, removal is carried out very rapidly by virtue of a very high diffusive rate of flow.

After having reached equilibrium, for example after from 5 to 60 minutes, the extraction or removal of pollutants, contaminants can be regarded as complete with virtually total effectiveness, for example of more than 85%, preferably of more than 99.9%.

The effectivenesses of extraction, removal of the contaminants, pollutants are, in all cases, very high, whatever the inorganic pollutants, contaminants.

The level of solvent used, that is to say the weight of dense fluid/solvent, preferably liquid and/or supercritical, employed, with respect to the surface area of the component (s) to be cleaned, can vary from 0 to 100 kg of fluid/cm$^2$ of component(s). According to an additional advantage of the invention, the level of solvent used is markedly lower when the substrate is subjected to mechanical action, for example when stirring of the substrate is carried out and when it is subjected to jets of $CO_2$ fluid.

Thus, advantageously, the components or substrates to be cleaned can be placed in a moving perforated drum or basket, for example driven with a rotational movement, inside a pressurized chamber comprising the dense pressurized $CO_2$ fluid.

The substrate or components can in addition be simultaneously subjected advantageously to the action of a high-speed jet of the dense $CO_2$ fluid.

The process according to the invention combines one or more mechanical effects or actions with the simple bringing of the polluted or contaminated components into contact with the $CO_2$ fluid, in particular dense pressurized $CO_2$ fluid.

These mechanical effects are, for example, respectively the stirring or mixing effect due to the movement of the pan or drum in which the components are found and, optionally, on the other hand, the stripping, pickling, blasting effect due to the impact of the high-speed jets of dense fluid on the substrates or components. This high-speed jet advantageously makes it possible to complete the cleaning or decontamination and to remove any residual contamination from the components.

The combination of the action of the jet(s) and of the stirring due to the movement of the rotary basket results in an unexpected enhancement of the cleaning performance by a dense pressurized fluid in comparison with the processes of the prior art.

In addition, a synergy occurs between the mechanical energy provided by the stirring and/or the pressurized jets and the physicochemical effect of the surfactant.

The drum or basket can be driven with a rotational movement, it being possible for the direction of rotation optionally to be periodically reversed.

The rotary drum or basket can also be driven with an oscillating, pendular, movement.

The possibility of reversing the direction of rotation or of communicating an oscillating, pendular, movement, for example, according to the type of component to be cleaned, is precisely one of the advantages contributed by moving the rotary drum or basket using a direct drive shaft.

In the process according to the invention, the term "high-speed jet" is generally understood to mean a speed of the fluid of 1 to 500 m/sec, which makes it possible to ensure optimum stripping, pickling, blasting of the component subjected to the action of this jet, that is to say struck by this jet.

When the movement of the rotary pan or drum is a rotational movement, the rotational speed is generally from 5 to 500 revolutions per minute.

It is possible according to the invention to maintain high speeds, even for large amounts and weights of components to be cleaned.

Another way of subjecting the substrate and/or the extraction medium to a mechanical action is to place the substrate in a vertical chamber filled with the extraction medium and comprising one or more stirrers in the form of paddles, propellers, and the like, for example driven by a vertical shaft, which stir or mix the said extraction medium.

In addition, it is advantageously possible to subject the substrate and/or the extraction medium to the action of ultrasound.

Advantageously, subsequent to the cleaning or the extracting with the dense pressurized fluid $CO_2$, the $CO_2$, the nonhalogenated surface-active compound, the complexing agent and the optional cosolvent, on the one hand, and the solid radioactive particulate inorganic contaminants, on the other hand; or else the $CO_2$, on the one hand, and the nonhalogenated surface-active compound, the complexing agent and the optional cosolvent, and the solid radioactive particulate inorganic contaminants, on the other hand; are separated by one or more physicochemical separation stages; and the $CO_2$ fluid, the nonhalogenated surface-active compound, the complexing agent and the optional cosolvent are recycled or reconditioned together, or else the $CO_2$ fluid is recycled or reconditioned alone, to the cleaning or decontamination stage, to the pressurized chamber.

The said physicochemical separation stage or stages can be carried out in one or more cyclone separators.

These separation stages relate to the surfactants, the complexing agent and the optional cosolvent, and the contaminant particles dispersed in the fluid.

Conventionally, the first separation stages can consist of a reduction in the density of the fluid by a series of a successive reductions in pressure and reheatings, in order to approach the gaseous state, or else one or more separations under isobaric conditions and at constant temperature can be carried out.

The "solvent" power is directly related to the density of the fluid. The denser the fluid, such as supercritical $CO_2$, the more it exhibits a solvent power, in particular with regard to the surfactants. Thus, in the stages for separation of particles, the solvent power of the fluid decreases and a portion of the extracts dissolved, solubilized, beforehand, during the cleaning or extraction stage, is thus recovered.

Thus, the process according to the invention for cleaning or decontaminating components or substrates makes it possible to physically recover, at the end of the treatment, on the one hand the cleaned substrates or components and, on the other hand, undesirable products, the handling, the treatment or the removal of which can be carried out specifically and thus can be easily controlled, while the gas or fluid can advantageously be recycled with the surfactant and the other optional additives in order to carry out a further extraction or cleaning.

Before the recycling, the process can comprise, inter alia, a stage of distillation of the dense fluid which makes possible virtually complete purification in accordance with the document FR-A1-2 586 938 (U.S. Pat. No. 4,824,570).

For this reason, the cleaning or extraction process can be carried out in a closed circuit or in a loop, which means, advantageously, that, by virtue of an initial and constant charge of fluid, such as $CO_2$, it is possible to gradually remove, from the components, the undesirable contaminating or polluting compounds.

More specifically and subsequent to the cleaning process proper, the process according to the invention advantageously comprises one or more stages, for example up to three stages, of physicochemical separation in which the density of the $CO_2$ is reduced, for example by a series of successive reductions in pressure and reheatings, preferably from 1 to 3 in number, in order to approach the gaseous state and to reach it.

The conditions prevailing in these successive stages will, for example, be as follows: 90 bar and 50° C., 70 bar and 40° C., and 50 bar and 40° C.

The solid particles of contaminants previously dispersed in the $CO_2$ during the cleaning or extraction stage are thus recovered.

The recovered particles can be specifically treated, destroyed or immobilized in appropriate matrices, in the case of radioactive oxides, such as $PuO_2$.

The gas obtained on conclusion of the separation (which comprises the surfactants, the complexing agent and the optional cosolvent) is preferably recycled to the cleaning, decontamination, extraction stage, where it is reconditioned, in order to place it again under temperature and pressure conditions for which it is in a supercritical state; the gas can thus be first of all cooled to atmospheric pressure, stored in liquid form, then reheated and compressed before being conveyed to the cleaning, decontamination or extraction process proper.

Before it is recycled, the fluid, for example the gaseous fluid, is preferably purified by one or more stages of adsorption and/or of liquefaction and/or of (re)distillation. Adsorption can, for example, be carried out with active charcoal or any other adsorbent agent, such as a zeolite, and (re)distillation is preferably carried out using the specific device described in the document FR-A1-2 586 938. This purification, carried out by adsorption, for example, by passing over active charcoal, and/or by distillation and/or by liquefaction, makes it possible to remove traces of volatile and/or $CO_2$-insoluble organic products entrained mechanically by the $CO_2$ during the preceding separation stages.

This is because thorough purification of the gas is generally necessary if the extraction and/or cleaning performances are not to be greatly reduced.

On completion of the decontamination, that is to say when it is considered that the contaminants or pollutants have been removed to the desired extent, a final stage of reducing in pressure, depressurizing or decompressing the pressurized chamber with the cleaned components which are found therein is carried out.

A device and a plant for carrying out the process according to the invention are described in particular in the documents FR-A-2 815 559, FR-A-2 754 464 and FR-A-2 798 879, to the description of which reference may be made.

The invention will be better understood on reading the following description, made with reference to the appended drawings, in which:

FIG. 1 diagrammatically represents a side sectional view of one of the cyclone separators which can be used in a plant for the implementation of the process according to the invention, this separator making possible the use of the separation according to a first embodiment of the latter;

FIG. 2 diagrammatically represents a side sectional view of one of the cyclone separators which can be used in a plant for the implementation of the process according to the invention, this separator making possible the use of the separation according to a second embodiment of the latter with a separating wall made of sintered material;

Figure 5:
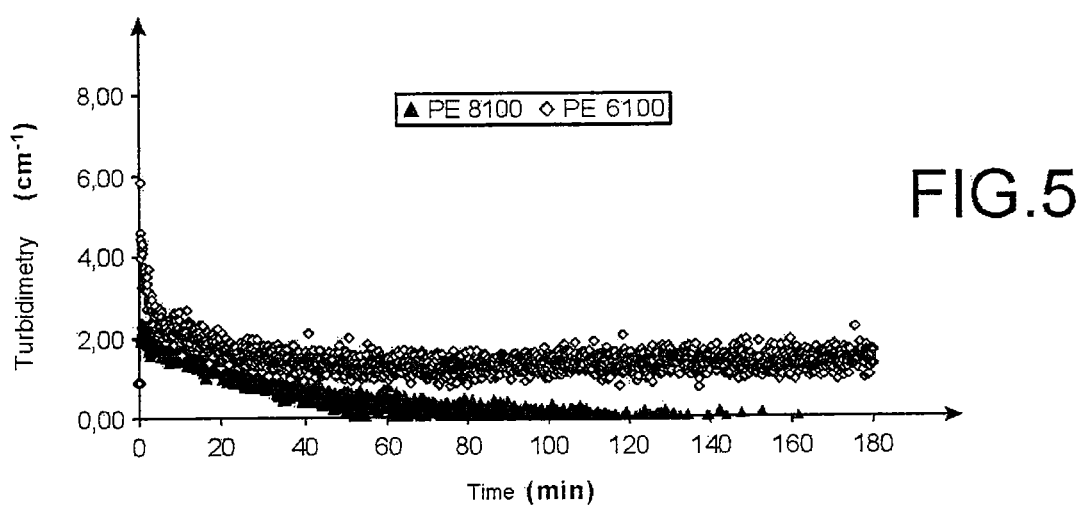

The tests are carried out with addition of 0 (■), 0.004% (▲), 0.016% (X), 0.032% (*) and 0.04% (●) by weight of Pluronic® PE 6100 to the supercritical $CO_2$;

FIG. 5 is a graph which gives the turbidity (in cm$^{-1}$) as a function of the time (in min) during tests (Example 3) on suspending cerium oxide powder with Pluronic PE 8100 or Pluronic PE 6100.

The points ▲ relate to the experiment with Pluronic® PE 8100 and the points ◇ relate to the experiment with Pluronic® PE 6100.

In fact, the plant according to the invention is substantially analogous to a conventional plant for the treatment, decontamination or cleaning of components with a dense pressurized fluid, for example a supercritical fluid. In addition, the plant optionally comprises some adaptations due to the specific characteristics of the process employed according to the invention concerning in particular the absence of water and the use of a specific surfactant, a specific complexing agent and optionally a cosolvent.

The plant according to the invention thus has all the advantages inherent to the process according to the invention, such as have already been indicated, and optionally the advantages inherent to the device, such as that of the document FR-A-2 815 559, or to an equivalent device, for example positioned vertically.

The plant comprises, as central element, a pressurized extracting chamber or autoclave.

The solid particles of polluting or contaminating compounds extracted from the substrates, components, parts, placed in the autoclave are brought into suspension and form a kind of "smoke" in the dense pressurized $CO_2$, for example supercritical $CO_2$, which is subsequently discharged, preferably via an orifice occurring in the top part of the autoclave, for example on the side wall of the latter or in the top cover.

This smoke is conveyed to separation means connected to the extractor or autoclave and comprising, for example, one or more, for example three, separators of cyclone type connected in series.

The reduction in pressure to which the fluid is subjected generally takes place at ambient temperature.

In the first or in each of the separators, separation or demixing takes place, on the one hand, of the solid particles of inorganic compounds extracted, which particles are optionally bonded to the surfactant adsorbed with the surfactant, and, on the other hand, of a fluid, for example a gas, such as $CO_2$, which optionally comprises the free surfactant in the case where the latter is not bonded to the particles.

The solid inorganic particles of compounds extracted from the components, parts, are withdrawn, optionally with the surfactant, for example, at the bottom, base of the separators, and recovered, and then optionally subjected to further separation, extraction or purification operations, for example centrifuging, separation by settling or liquid/liquid extraction, or destroyed.

The separation or demixing in each of the separators of cyclone type can take place according to two different embodiments.

In a first embodiment, on the one hand the contamination, namely the solid particles of radioactive inorganic compounds extracted, such as $PuO_2$, with the dissolved, solubilized, nonhalogenated surface-active compound, which precipitates with the contamination, and, on the other hand, the fluid $CO_2$ are separated.

In a second embodiment of the separation, the separation is carried out, on the one hand, of the contamination, namely the solid particles of radioactive inorganic compounds, such as $PuO_2$, and, on the other hand, of a $CO_2$ fluid phase, the nonhalogenated surface-active compound occurring in said $CO_2$ fluid phase, generally in the supercritical state, which can thus be recycled.

Figure 1:
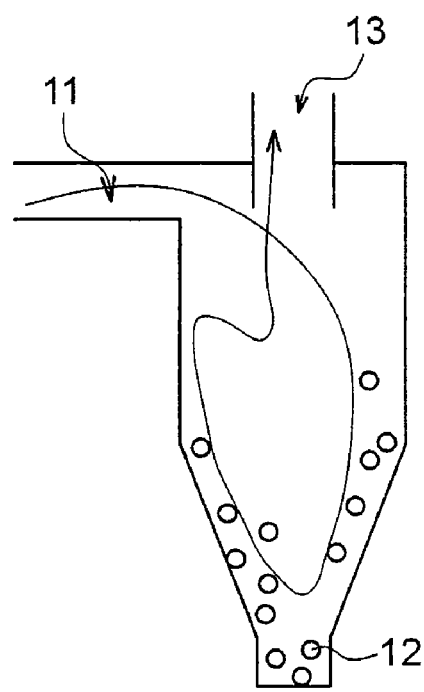

FIG. 1 diagrammatically represents the operation of one of the separators in the case where the separation is carried out according to the first embodiment of the latter with precipitation of the surfactant.

The smoke of $CO_2$ fluid and of solid particles with the adsorbed surfactant, which form a single phase, is introduced into the said cyclone via the pipe (11). The solid particles are separated by a combined effect of vortex and of reduction in the pressure and in the density of the fluid, which thus loses most of its solvent power, indeed even all its solvent power, if it becomes a gas again. The particles, with the surfactant which precipitates, are discharged via the bottom orifice (12), while the purified fluid $CO_2$ escapes via the top orifice (13). The particles of contaminants, for example of metal oxides, are recovered in the presence of surfactant. In this embodiment, the pressure and temperature conditions influence the separation as they control the solvent power of the $CO_2$ fluid and consequently the precipitation of the surfactant. According to the process of the invention in this embodiment of the separation, it is arranged for the reduction in the pressure and in density to be well controlled.

Ideally, in particular, in the first cyclone, the density of the $CO_2$ fluid must make it possible to retain the surfactants in the dense phase, for example supercritical phase, while releasing the particles alone.

A second, indeed even a third, cyclone make it possible to control the end of the reduction in pressure of the fluid $CO_2$ in order to return to the inlet pressure of the gas.

When the separation or demixing is carried out according to the second embodiment of the latter, the particles of contaminants are separated independently of the surfactant, which does not precipitate with the said particles.

This is because, in the process of the invention, as the particles of contaminants, such as $PuO_2$, are not at any time dissolved, solubilized, in the supercritical fluid, it is possible to separate them independently of the surfactant. It is sufficient for this to carry out a separation without a fall in pressure and temperature, an isobaric separation, which also allows the surfactant to remain in the supercritical phase, namely supercritical $CO_2$ phase. The particles of contaminant, for example $PuO_2$, can be separated by a vortex effect or else by filtration using any appropriate means, for example a wall made of sintered material.

The separation according to the second embodiment can be carried out in a device analogous to that described in FIG. 1 in which the pressure and the temperature are kept constant, the particles of contaminant being separated in this device under the effect of a simple vortex effect. Of course, in the case where the device of FIG. 1 is employed according to the second embodiment of the separation, only particles of contaminant devoid of surfactant are discharged via the bottom orifice (12) of the cyclone separator, while no longer pure fluid but fluid, such as $CO_2$, in which the surfactants are dissolved, solubilized, escapes via the top orifice (13).

Figure 2:
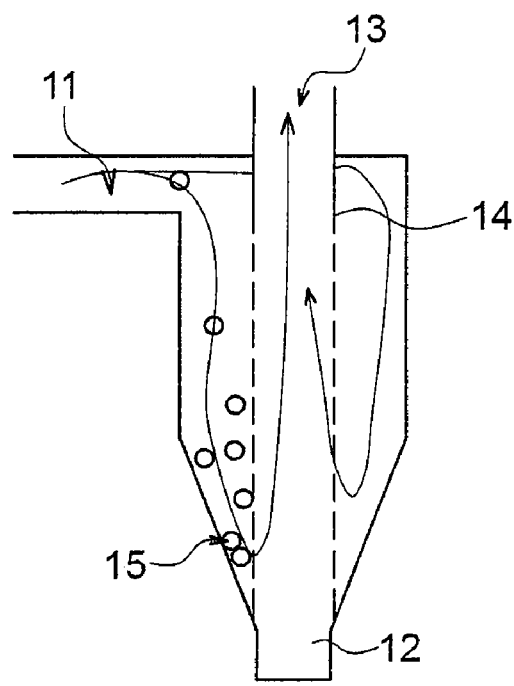

FIG. 2 represents a separator for the implementation of the separation according to the second embodiment of the latter in which the separation of the solid particles of contaminant is carried out via a wall (14) made of a sintered material, such as stainless steel.

This wall (14) is provided in the form of a cylinder situated in the extension of the top orifice (13) of the separator and extending as far as the bottom outlet orifice (12) of the cyclone separator. A region of fluid/solid separation (15) is thus defined in the vicinity of the base, bottom, of the said wall (14) made of sintered material.

The device of FIG. 2 operates without a fall in pressure and temperature.

In the configuration where the cyclonic separation is carried out according to the second embodiment, the surfactant is present in the supercritical $CO_2$ phase at the separator outlet. The pressure remains high and constant: the procedure is carried out in an isobaric manner and at constant temperature. This configuration according to the second embodiment makes it possible to operate with conventional pumps for all the separators functioning with fluid, such as liquid $CO_2$. It is possible, in a second separator, indeed even a third separator, to carry out a reduction in pressure in order to separate the surfactant and to obtain gaseous, $CO_2$ fluid.

In the case where the surfactant would be recycled directly at the process head, compressors will have to be used to make possible circulation in the supercritical loop. This is because the pressure then remains constant (and thus high) in order to keep the surfactant dissolved, solubilized, at any point of the process.

The invention will now be described with reference to the following examples, given by way of illustration and without imparting limitation.

EXAMPLES

In the following Examples 1 to 3, tests on dispersion of cerium oxide ($CeO_2$) powder with various Pluronic surfactants and for various concentrations of surfactant were carried out.

Principle of the experiment: a system composed of $CO_2$ and of the optional surfactant is set stirring and then the stirring is halted. The turbidity of the system is recorded as a function of the time.

The reduction in the turbidity reflects the sedimentation of the particles. The more effective the surfactants, the slower the return to equilibrium, reflecting a more effective maintenance in suspension of the particles.

In all the examples, mechanical stirring at 1000 revolutions per minute, obtained by rotation of a paddle stirrer, is employed.

Example 1

Figure 3:
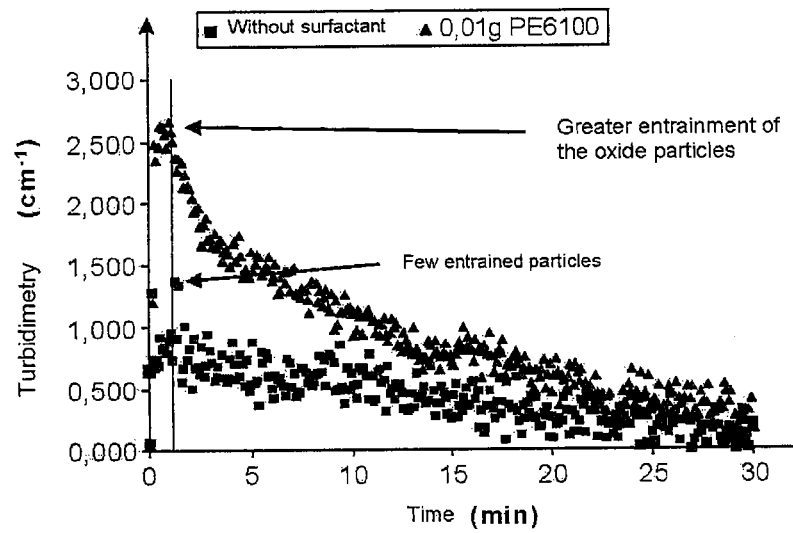
FIG. 3 is a graph which gives the turbidity (in cm$^{-1}$) as a function of the time (min) during tests (Example 1) on dispersing cerium oxide ($CeO_2$) powders carried out with $CO_2$ without addition of surfactant (points ■) and with $CO_2$ to which Pluronic® PE 6100 has been added in a proportion of 0.1 g/kg of $CO_2$ (points ▲)

Comparison of a System without Surfactant and with the Presence of Pluronic® PE 6100 in a Proportion of 0.1 g/kg of $CO_2$ The results obtained are illustrated in FIG. 3. The points ■ relate to the experiment without surfactant, while the points ▲ relate to the experiment with addition of Pluronic® PE 6100 in a proportion of 0.1 g/kg of $CO_2$.

It is found that the addition of surfactant in accordance with the invention promotes greater suspending of the cerium oxide powder and greater entrainment of the oxide particles (higher initial turbidity) and considerably slows down the sedimentation of the particles (slowly decreasing turbidity). In the absence of surfactant, fewer particles are entrained.

Example 2

Comparison of Different Concentrations of Surfactant (Pluronic® PE 6100)

In this example, experiments are carried out with respectively the addition of 0 (points ■), 0.004% (points ▲), 0.016% (points X), 0.032% (points *) and 0.04% (points ●) by weight of Pluronic® PE 6100 to the supercritical $CO_2$.

Figure 4:
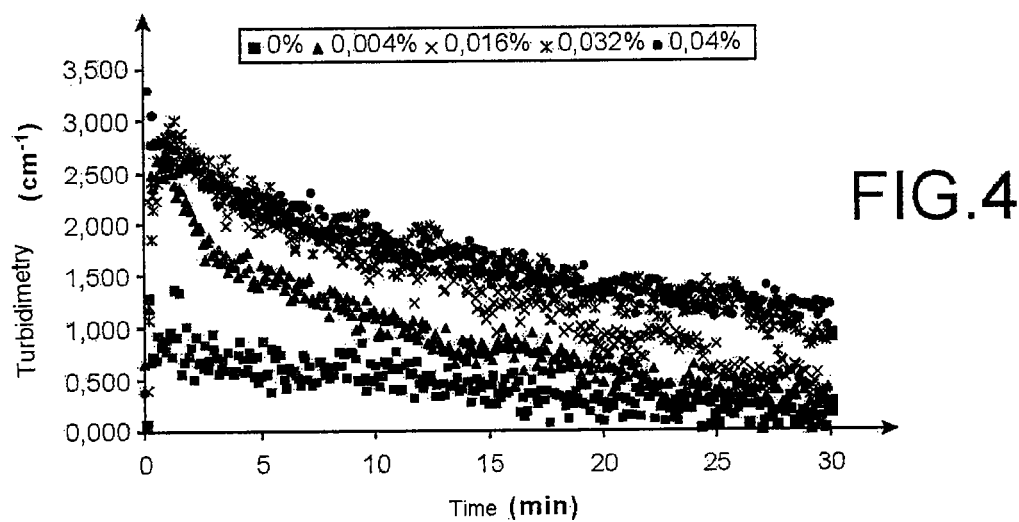
FIG. 4 is a graph which gives the turbidity (in cm$^{-1}$) as a function of the time (in min) during tests (Example 2) on suspending cerium oxide powder with $CO_2$ comprising various proportions of Pluronic® PE 6100.

In FIG. 4, it is found that the effectiveness of the resuspending is improved by the increase in the concentration. A concentration of the order of 0.04% by weight appears optimum.

Example 3

Comparison of the Surfactants Pluronic PE 6100 and Pluronic PE 8100

In this example, experiments are carried out with respectively Pluronic® PE 6100 and Pluronic® PE 8100 in a proportion of 0.04% by weight; the results obtained are illustrated in FIG. 5. The points ▲ relate to the experiment with PE 8100 and the points ◇ relate to the experiment with PE 6100.

It is found that, for this experiment, the value of the turbidity stabilizes in a lasting fashion in the case of PE 6100, reflecting the complete stabilization of one category of particles (the smallest in size). PE 6100 is thus more effective, which is explained by better salvation of the PPO units in the SC $CO_2$ in comparison with the PE 8100.

In the following Examples 4 to 6, samples contaminated with cerium oxide powder were decontaminated by the process of the invention using a plant analogous to that described in the above-mentioned documents, the fluid being dense pressurized $CO_2$.

Example 4

Tests on Polyethylene Samples

Polyethylene samples in the form of discs with a diameter of approximately 4 $cm^2$ and a total surface area on both sides of 30.4 $cm^2$ are prepared by coating them with cerium oxide powders in a proportion of approximately 20 mg per sample. The difference in weight of the samples is measured before and after the test.

The effectiveness of the decontamination is given by the following formula:

$$\text{Effectiveness \%} = \left(1 - \frac{\text{weight of the sample after cleaning}}{\text{weight of the sample before cleaning}}\right) \times 100$$

The results obtained are collated in the following Table 1.

TABLE 1

| Test | Surfactant | Cosolvent or complexing agent | Effectiveness |
|---|---|---|---|
| 1 | PE 8100 0.04% |  | 91% |
| 2 | PE 8100 0.06% | Propanol 0.5% | 90% |

TABLE 1-continued

| Test | Surfactant | Cosolvent or complexing agent | Effectiveness |
|---|---|---|---|
| 3 | PE 8100 0.04% | Propanol 1% | 87% |
| 4 | | TBP 0.5% | 86% |
| 5 | | Propanol 0.5% | 93% |

NB:
The TBP acts both as complexing agent and as cosolvent.

The results obtained show an excellent effectiveness.

Example 5

Influence of the Cosolvents

In order to demonstrate the effect due to the cosolvents, additional tests were carried out on green polyurethane gloves contaminated with $CeO_2$ in a proportion of 20 mg per sample. The following results are obtained:

TABLE 2

| Test No. | % Weight Pluronic ® PE 8100 | % Propanol | Effectiveness % |
|---|---|---|---|
| 1 | 0.04 | 0 | 31 |
| 2 | 0.04 | 0.5 | 96 |

The addition of cosolvent, in this instance of propanol type, makes it possible to significantly increase the effectiveness of the process.

Example 6

Test on PVC Samples

In this experiment, PVC components (discs with a diameter of approximately 4 cm and a total surface area on both sides of 30.4 cm$^2$) contaminated with $CeO_2$ in a proportion of approximately 20 mg per sample are decontaminated. The difference in weight of the samples is measured before and after the test.

In this case, both the gain due to the complexing agent (in this instance TBP, which also acts as cosolvent) and to the interaction of the $CO_2$ with the PVC are demonstrated. This is because the strong interaction of the $CO_2$ and of the PVC results in a modification of the structure of the polymer due to the dissolution, solubilization, of a portion of its components.

The improvement related to the addition of TBP in comparison with a reference test without TBP is shown in Table 3 below.

TABLE 3

| Test No. | % Weight PE 8100 | % TBP | Improvement in effectiveness % |
|---|---|---|---|
| 1 | 0.04 | 0 | reference |
| 2 | 0.04 | 0.5 | 15% with respect to the reference test |

Example 7

In this Example, the Effect Related to the Combination of Mechanical Stirring and Surfactant is Shown In this example, the effectiveness of the cleaning brought about by the joint use of $CO_2$ as solvent, of a specific nonhalogenated surfactant and of the mechanical effects caused by stirring with a paddle stirrer at 1500 rev/minute is shown.

The duration of the cleaning or decontamination cycle is 30 minutes. The experiment is carried out on pretared rectangular (5×5 cm) stainless steel plates, one face of which is coated mechanically by rubbing with a contaminant. The components are contaminated with 5 g of $CeO_2$ per kg.

However, the results of this example can be transposed to the decontamination of organic substrates.

The surface weight of contaminant is determined by weighing before and after cleaning with $CO_2$. The effectiveness of the cleaning as a percentage is obtained by the following formula:

$$\text{Effectiveness \%} = \left(1 - \frac{\text{weight of the sample after cleaning}}{\text{weight of the sample before cleaning}}\right) \times 100$$

In a first experiment, a test specimen is decontaminated, cleaned in accordance with the process of the invention by employing $CO_2$ at 250° C. and 40 bar, to which a nonhalogenated surfactant, which is Pluronic® PE 8100 $(EO)_3$-$(PO)_{42}$-$(EO)_3$ available from BASF®, has been added in a proportion of 100 mg of PE 8100 dissolved in 2 g of ethanol.

The extraction medium in which the components are immersed is stirred at the rate of 1500 rev/minute.

For the purposes of comparison:
a plate contaminated with $CeO_2$ is cleaned under the same conditions but by simple contact between the latter and $CO_2$, without addition of surfactant and without stirring,
a contaminated plate is cleaned under the same conditions, with addition of a surfactant, which is PE 8100, in a proportion of 40 mg but without stirring.

This comparison is presented in Table 4, with the surface contamination and the operating conditions.

TABLE 4

| Surfactant | Pressure | Temperature | Stirring | Effectiveness |
|---|---|---|---|---|
| Without | 250 bar | 40° C. | No | 0% |
| PE 8100 (40 mg) | 250 bar | 40° C. | No | 0% |
| PE 8100 + ethanol | 250 bar | 40° C. | 1500 rev/min | 85% |

Table 4 shows the considerably greater effectiveness of the process of the invention, combining supercritical fluid, specific nonhalogenated surfactant and mechanical action (stirring), in comparison with a process where stirring is not carried out, although a nonhalogenated surfactant is employed, and in comparison with a process employing neither stirring nor a nonhalogenated surfactant, in particular a nonfluorinated surfactant.

The invention claimed is:

1. A process for decontaminating a solid organic substrate contaminated by solid radioactive particulate inorganic contaminants, comprising:
   contacting the solid organic substrate with an extraction medium, wherein the extraction medium is devoid of water and comprises:
      dense pressurized $CO_2$;
      at least one nonhalogenated surface-active compound chosen from the group consisting of block copolymers of poly(ethylene oxide) and poly(propylene oxide); and polydi(1 to 6C)alkylsiloxanes; and
      at least one complexing agent chosen from the group consisting of tributyl phosphate, crown ethers, tributylphosphine oxide, triphenylphosphine oxide, and tri(n-octyl)phosphine oxide; and subjecting the solid organic substrate or the extraction medium, or both the solid organic substrate and the extraction medium, to a mechanical action simultaneously with the contacting operation, thereby decontaminating the solid organic substrate of solid radioactive particulate inorganic contaminants.

2. The process according to claim 1, wherein interfacial tension is present between reference water and $CO_2$ in the extraction medium and the at least one nonhalogenated surface-active compound lowers the interfacial tension between the reference water and $CO_2$ below 10 $mN \cdot m^{-1}$.

3. The process according to claim 1, wherein the at least one nonhalogenated surface-active compound represents from 0.001 to 1% by weight of the extraction medium.

4. The process according to claim 1, wherein the at least one complexing agent represents from 0.001 to 1% by weight of the extraction medium.

5. The process according to claim 1, wherein the dense pressurized $CO_2$ is at a pressure of 50 to 700 bar and at a temperature of 15 to 200° C.

6. The process according to claim 1, wherein the dense pressurized $CO_2$ is at a pressure of 80 to 300 bar and at a temperature of 20 to 80° C.

7. The process according to claim 1, wherein the dense pressurized $CO_2$ is at a pressure of 100 to 150 bar and at a temperature of 40 to 60° C.

8. The process according to claim 1, wherein the dense pressurized $CO_2$ is in a liquid or supercritical state.

9. The process according to claim 1, wherein compression/decompression cycles are carried out.

10. The process according to claim 9, wherein the compression/decompression cycles are carried out with an amplitude of variation in pressure of 10 to 100 bar and time intervals of 10 seconds to 10 minutes.

11. The process according to claim 1, wherein the mechanical action is chosen from one or more of the following: stirring, turbulence, shearing, electromechanical action, and ultrasonic action.

12. The process according to claim 1, wherein the extraction medium additionally comprises a cosolvent.

13. The process according to claim 12, wherein the cosolvent is chosen from the group consisting of lower aliphatic alcohols having from 1 to 5 carbon atoms, terpenes, cyclohexanes, hexanes, ketones, dimethyl sulphoxide, and their mixtures.

14. The process according to claim 12, wherein the cosolvent represents from 0.001 to 10% by weight of the extraction medium.

15. The process according to claim 1, wherein, subsequent to the contacting operation, one of the following operations occurs:

the dense pressurized $CO_2$, the nonhalogenated surface-active compound, the complexing agent and an optional cosolvent are separated from the solid radioactive particulate inorganic contaminants by one or more physicochemical separation stages and the dense pressurized $CO_2$, the nonhalogenated surface-active compound, the complexing agent and the optional cosolvent are recycled or reconditioned together, or alternatively, the dense pressurized $CO_2$ is separated from the nonhalogenated surface-active compound, the complexing agent, the optional cosolvent, and the solid radioactive particulate inorganic contaminants by one or more physicochemical separation stages and the dense pressurized $CO_2$ is recycled or reconditioned alone.

16. The process according to claim 15, wherein the one or more physicochemical separation stages are carried out in one or more cyclone separators.

17. The process according to claim 16, wherein separation of the dense pressurized $CO_2$ from the nonhalogenated surface-active compound, the complexing agent, the optional cosolvent, and the solid particulate inorganic contaminants is carried out by a combined effect of vortex and of reduction in the pressure and in the density of the dense pressurized $CO_2$.

18. The process according to claim 16, wherein separation of the dense pressurized $CO_2$, the nonhalogenated surface-active compound, the complexing agent and the optional cosolvent from the solid radioactive particulate inorganic contaminants is carried out by a vortex effect or by filtration, without a fall in pressure or temperature.

19. The process according to claim 15, wherein, the dense pressurized $CO_2$, whether in combination with the nonhalogenated surface-active compound, the complexing agent and the optional cosolvent or alone, is purified by one or more stages of adsorption, liquefaction, or (re)distillation before it is recycled.

20. The process according to claim 1, wherein the substrate to be decontaminated is placed in a moving perforated drum or basket inside a pressurized chamber comprising the dense pressurized $CO_2$.

21. The process according to claim 20, wherein the drum or basket is driven with a rotational movement.

22. The process according to claim 20, wherein the substrate is additionally, simultaneously subjected to a high-speed jet of the dense pressurized $CO_2$.

23. The process according to claim 20, wherein the extraction medium or the substrate or both the extraction medium and the substrate to be decontaminated are additionally subjected to ultrasound.

24. The process according to claim 1, wherein the organic substrate is made of a solid material chosen from the group consisting of artificial, synthetic or natural fabrics; polymers; plastics; resins; latexes; rubbers; and composite materials comprising a combination of several of said materials.

25. The process according to claim 1, wherein the solid radioactive particulate inorganic contaminants comprise polar compounds.

26. The process according to claim 1, wherein the solid radioactive particulate inorganic contaminants comprise free metals or semimetals in the form of their radioactive isotopes, compounds of these radioactive metals or semimetals, or radioactive isotopes of iodine, tritium and tritiated organic compounds.

27. The process according to claim 26, wherein the metal or semimetal compounds are chosen from the group consisting of their oxides, their salts and their organometallic derivatives.

28. The process according to claim 26, wherein the metals are chosen from the group consisting of transition metals, actinides and lanthanides.

29. The process according to claim 16, wherein the metals are chosen from the group consisting of strontium, silver, caesium, antimony, cobalt, manganese, neodyme, cerium, uranium, plutonium, americium, lanthanum and thorium.

30. The process according to claim 1, wherein the solid radioactive particulate inorganic contaminant comprises an oxide chosen from the group consisting of $PuO_2$, $UO_2$, $CeO_2$, $Nd_2O_3$, caesium, americium, antimony, manganese, cobalt and silver oxides.

31. The process of claim 1, wherein said block copolymer of poly(ethylene oxide) and poly(propylene oxide) is selected from the group consisting of $(EO)_x$—$(PO)_y$ diblock copolymers, $(EO)_x$—$(PO)_y$-$(EO)_x$ triblock copolymers and $(PO)_x$-$(EO)_y$—$(PO)_x$ triblock copolymers, wherein x and y are integers from 2 to 80 and x is other than y.

32. The process of claim 1, wherein said polydi(1 to 6C)alkylsiloxane is polydimethylsiloxane.

* * * * *